Feb. 16, 1932.   F. ALEXANDER ET AL   1,845,777
METAL ELECTRODE AND METHOD OF MAKING THE SAME
Filed Jan. 5, 1929
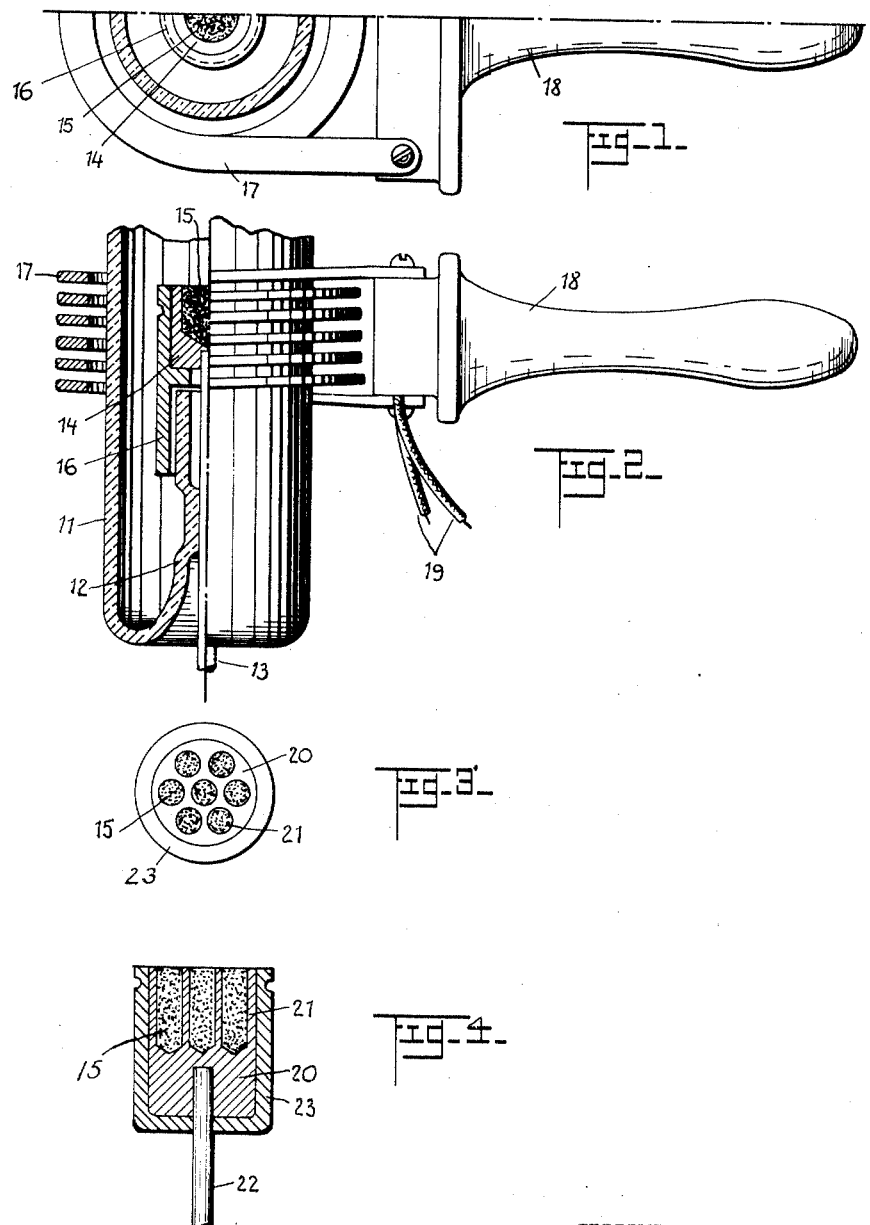
FOCSANEANU ALEXANDER
& JAMES P. GIBSON.
INVENTORS.
BY Rudolf Hilderman
ATTORNEY.

Patented Feb. 16, 1932

1,845,777

UNITED STATES PATENT OFFICE

FOCSANEANU ALEXANDER AND JAMES P. GIBSON, OF NEW YORK, N. Y., ASSIGNORS TO ARGCO TUBE AND TELEVISION CORPORATION, A CORPORATION OF DELAWARE

METAL ELECTRODE AND METHOD OF MAKING THE SAME

Application filed January 5, 1929. Serial No. 330,528.

Our invention relates to metallic electrodes for luminescent tubes and the method of making the same; in particular it refers to making electrodes of those classes of metals the use of which as luminescent tube electrodes is characterized by resulting in a low cathode-potential-drop. Such elements and their compositions are frequently called non-sputtering metals, and as such a class they comprise the metals of the alkalies, the metals of the alkaline earths, other bi-valent metals such as beryllium, and some tri-valent elements like aluminum. The metals of the alkalies, as far as they have a comparatively low melting point, are not as well suited for electrode use; and in the following, when having reference to the particular group of elements we desire to include among the electrode materials which our invention concerns, we simply refer to the metals of the alkaline earths because they are the group of metals most eminently fitted for the use in our electrodes. Such specific reference is however in no way to be considered as an exclusion of the whole group of elements which we have defined above, i. e. non-sputtering metals of comparatively high melting points.

The elements which form the subject of this invention are known to be well adapted for electrode use; but since they cannot readily be produced in a compact form of a structure, which would render their use of practical value, very little has been achieved in producing good luminescent tubes in which they are incorporated as electrodes. We have succeeded in constructing a longevous and efficient electrode of such metals and a simple process of making same. Having that general object in mind, we have tried to reach and we have attained other objects, some of which are, first, to produce, in a solid shape, electrodes of said elements; second, to provide means for retaining such electrodes in a coherent form; third, to introduce electrodes composed of such elements into a luminescent tube in a form in which they readily lend themselves to the process of finishing such tubes; forth, to be able to sinter or fuse such metals into a permanent unit; fifth, to degasify said electrodes simultaneously with said sintering or fusing process; sixth, to carry through the last mentioned processes without causing a sputtering of the electrode material; seventh, to provide means for having a full control of the manner in which heat is applied in said process.

We attain these and other objects by proceeding in the manner described below and by the use of the means illustrated in the accompanying drawings, in which—

Figure 1 shows the substantially bi-sected top view of the end of a luminescent tube which contains an electrode of our invention. A high frequency coil is shown around the tube, in a position for treating the electrode material.

Figure 2 shows a corresponding side view of the parts of Figure 1, in which a 90 degree sector has been cut away to show the arrangement of our electrode on the inside of the tube.

Figure 3 shows a top view of a large electrode in which our invention is incorporated.

Figure 4 shows a corresponding sectioned side view.

Similar numerals refer to similar parts throughout the various views.

In Figures 1 and 2 our invention is shown mounted on the inside of a tube 11, supported by a stem 12, which is fused into the tube and into which is fused the conductor 13 which carries the current to the electrode. To the end of the conductor 13 is attached, in the tube, the container 14 which is made out of iron or other metals which are suited to be heated up by eddy-currents inductively generated therein. This container 14 is filled with our electrode material 15. A refractory re-enforcing and protective sleeve 16 is slipped over the end of the stem 12 and retains in its upper end the container 14.

The high frequency coil 17 is mounted upon the handle 18 by means of which the operator holds it in a position suitable for processing the electrode material. Cables 19 connect the high frequency coil to a suitably controlled source of high frequency current.

The electrode shown in Figures 3 and 4 shows a larger container 20 with a multiplicity of openings 21 in which is retained our electrode material 15. A conductor 22 serves to connect the container 20, through the wall of the tube, to the source of current. Corresponding to the arrangement of sleeve 16 in Figures 1 and 2 refractory material 23 suitably encloses the sides and the bottom of container 20.

In the application of our invention we proceed as follows:

The unit comprising the container 14 and the conductor 13 leading up to it are sealed into the stem, the sleeve 16 being assembled between them to hold them in alignment, whereupon the metal of the alkaline earths or a so-called non-sputtering metal, 15, is placed into container 14. It may be packed in there solidly by some means of compressing it in position. As a next step of procedure the two stem units, assembled as described above, are mounted in the ends of the tube and the tube is exhausted and filled with the purified gas, in line with the procedure well known to those acquainted with the art of making incandescent lamps and tubes.

While the tube is being exhausted, before it is filled with the gas, we slip the coil 17 over the one and the other of the electrodes and high frequency current is admitted to the coil after it has been brought into a position of alignment with the container 14. If we now energize the coil by high frequency current from a suitable source of power, this current sets up eddy-currents in the container 14 which bring it to such heat as to drive from said container the gases occluded therein and the heat melts or fuses the contents 15 of the container 14 whereby substantially all foreign matter and undesirable gases are driven off. At the same time the material 15 is fused or sintered into a body solidly seated in and protected by the container 14.

By properly proportioning the amount of the metal at the bottom and on the sides of container 14 the heating effect produced in the contents of said container can be fully controlled during the period of the application of the high frequency currents. We thus are able to start the fusion of the contents of the container from the bottom up or from the sides in, whichever way proves preferable. It is of course necessary that the operator controls the total amount of heat introduced by regulating the high frequency current introduced into the high frequency coil.

A similar full control of the degasifying process we obtain in the larger electrode shown in Figures 3 and 4, the body 20 of the container, which is heated by the high frequency currents, being arranged to approach the metals of the alkaline earths contained in openings therein by being proportioned so as to diffuse the heat, created in it by high frequency currents, into all parts of the electrode material. In this case as well as in the case of the smaller electrodes of Figures 1 and 2 the thickness of the walls between and around the metals of the alkaline earths, the amount of metal of the container located below said electrode material and the area subject to the inductive influence of the high frequency coil allow a full control of the heat in the electrode material so that excessive heating, vaporization, and localized or uneven heat can be completely avoided and overcome.

After the tube is finished the sleeve 16 and the container 14 offer suitable protective means for the electrode and expose it only in the direction in which it serves for the discharge through the luminescent tube.

The convenience of the application of our process for the purpose of making and degasifying electrodes made out of metals of the alkaline earths, made out of the non-sputtering metals referred to above and made out of any metals for which the use of a container and the application of high frequency currents may be found convenient, is evidently not restricted to the process of manufacture of the tubes but it has advantages in yielding a more effective and more efficient electrode as well as in avoiding a splashing or any derangement of the contents of the container, i. e. of the electrode proper, in the making or in the use of our luminescent tube.

With these considerations in mind we claim a broad protection of our invention within the scope of the appended claims.

We claim:

1. The method of making an electrode of non-sputtering metal for a luminescent tube, consisting of arranging said metal in a conductive container in said tube, rarefying the atmosphere in said tube, and bringing said container in said rarefied atmosphere to heat by setting up eddy-currents therein by inductively coupling said container to a coil carrying high frequency current, said heat being transmitted to said metal and causing it to settle in said container in a state suitable for electrode use.

2. The method of making an electrode of non-sputtering metal for a luminescent tube, consisting of arranging said metal in a conductive container surrounded by a refractory heat-insulating material in said tube, rarefying the atmosphere in said tube, and bringing said container in said rarefied atmosphere to heat by setting up eddy-currents therein by inductively coupling said container to a coil carrying high frequency current, said heat being transmitted to said metal and causing it to settle in said container in a state suitable for electrode use.

3. The method of making an electrode of non-sputtering metal for a luminescent tube, consisting of arranging said metal in a conductive container in said tube, rarefying the atmosphere in said tube, bringing said container in said rarefied atmosphere to heat by setting up eddy-currents therein by inductively coupling said container to a coil carrying high frequency current, said heat being transmitted to said metal and causing it to settle in said container in a state suitable for electrode use, and evacuation of said tube while said container is being brought to heat.

4. The method of making an electrode of metal of the alkaline earths for a luminescent tube, consisting of arranging said metal in a conductive container in said tube, rarefying the atmosphere in said tube, bringing said container in said rarefied atmosphere to heat by setting up eddy-curents therein by inductively coupling the said container to a coil carrying high frequency current, said heat being transmitted to said metal and causing it to settle in said container in a state suitable for electrode use, and evacuation of said tube while said container is being brought to heat.

Signed at New York, in the county of New York, and State of New York, this 31st day of December, A. D. 1928.

FOCSANEANU ALEXANDER.
JAMES P. GIBSON.